United States Patent [19]

Jung

[11] Patent Number: 5,722,587
[45] Date of Patent: Mar. 3, 1998

[54] METHOD OF CONTROLLING A HUMIDIFIER SO AS TO SUPPLY ATOMIZED WATER INTO ROOMS IN ACCORDANCE WITH VOLUMES OF ROOMS

[75] Inventor: Woong Jung, Kyeongki-do, Rep. of Korea

[73] Assignee: Daewoo Electronics Co., Ltd., Seoul, Rep. of Korea

[21] Appl. No.: 714,448

[22] Filed: Sep. 16, 1996

[30] Foreign Application Priority Data

Sep. 16, 1995 [KR] Rep. of Korea .............. 95-30340

[51] Int. Cl.$^6$ ............................................. F24F 6/12
[52] U.S. Cl. ......................................... 236/44 A; 165/229
[58] Field of Search ........................ 236/44 R, 44 A, 236/44 B; 165/222, 223, 229; 261/DIG. 34; 62/176.1, 176.4, 176.6, 171

[56] References Cited

U.S. PATENT DOCUMENTS

| | | | |
|---|---|---|---|
| 4,671,456 | 6/1987 | Groff et al. | 165/229 X |
| 4,852,363 | 8/1989 | Kampf et al. | 62/176.6 |
| 5,346,128 | 9/1994 | Wacker | 236/44 A |
| 5,520,328 | 5/1996 | Bujak, Jr. | 236/44 A |

FOREIGN PATENT DOCUMENTS

| | | |
|---|---|---|
| 2270153 | 3/1994 | United Kingdom. |
| 9425182 | 11/1994 | WIPO. |

*Primary Examiner*—Harry B. Tanner
*Attorney, Agent, or Firm*—Beveridge, DeGrandi, Weilacher & Young LLP

[57] ABSTRACT

Disclosed is a method of controlling a humidifier. The method comprises the steps of recording a humidity of a room, setting a desirable humidity and the operating time by handling a key input section, recording a first present time, recording a second present time when the humidity in the room has reached a predetermined humidity, recording an elapsed time from the first present time to the second present time, comparing the elapsed time with the look-up tables, determining the volume of the room, and operating a vibrator with a predetermined frequency according to the volume of the room. The method make the humidifier supply a proper amount of atomized water into the room in accordance with the volume of the room, thereby providing an optimum humidity in the room.

30 Claims, 5 Drawing Sheets

METHOD OF CONTROLLING A HUMIDIFIER SO AS TO SUPPLY ATOMIZED WATER INTO ROOMS IN ACCORDANCE WITH VOLUMES OF ROOMS

BACKGROUND OF THE INVENTION

1. Field of the Invention

The present invention relates to a humidifier, more particularly to a method of controlling a humidifier in such a manner that the humidifier can supply a proper amount of atomized water into a room in accordance with the volume of the room, thereby providing an optimum humidity in the room.

2. Description of the Prior Art

As is well known, a humidifier is an appliance for keeping the atmosphere moist in a room by supplying atomized water into the room. Recently, the humidifier has widely been used as a household appliance in order to prevent respiratory organs of a family from being infected with disease, and in order to make the environment in a house more pleasant.

Figure 5:
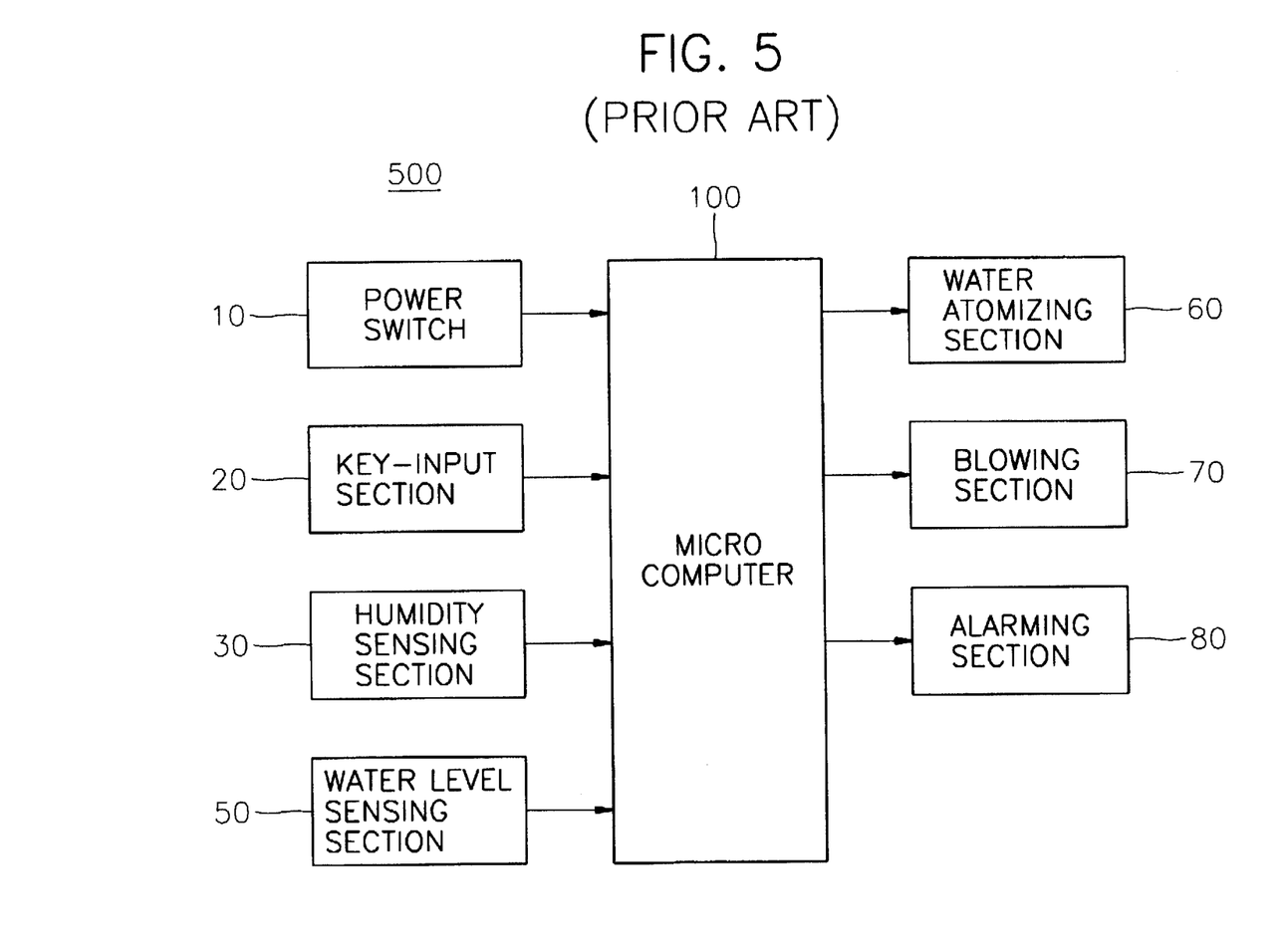
FIGS. 5 is a block diagram representing a schematic construction of a conventional humidifier.

FIG. 5 shows a block diagram representing a schematic construction of a conventional humidifier 500. As shown in FIG. 5, humidifier 500 comprises a microcomputer 100 for controlling the operation of humidifier 500, and a power switch 10 connected to microcomputer 100 for sending an operating signal to microcomputer 100. Humidifier 500 further comprises a key-input section 20 for setting various factors such as a desirable humidity, an operating time, and an frequency of an ultrasonic vibrator, etc. Humidifier 500 also has a humidity sensing section 30 which senses a humidity in a room and then sends data thereof to microcomputer 100, and a water level sensing section 50 which senses a level of water contained in a water vessel installed in humidifier 500 and then sends a signal to microcomputer 100 when water contained in the water vessel is insufficient.

Humidifier 500 further comprises a water atomizing section 60 which atomizes water contained in the water vessel, a blowing section 70 for blowing atomized water into the room, and an alarming section 80 for indicating an insufficiency of water in the water vessel.

Key-input section 20 includes a plurality of button switches which are connected to microcomputer 100 and are provided on an outer surface of humidifier 500. Humidity sensing section 30 includes a humidity sensor which is attached to the outer surface of humidifier 500 and which is connected to microcomputer 100. Water level sensing section 50 includes a float switch installed in the water vessel. In addition, water atomizing section 60 includes an ultrasonic vibrator disposed adjacent to the water vessel, blowing section 70 includes a blower, and alarming section 80 includes an alarm lamp.

Humidifier 500 having the above construction operates as follows.

Even when power switch 10 is turned off, humidity sensing section 30 senses the humidity in the room. The humidity level detected by humidity sensing section 30 is displayed by a displaying means such as a lamp, so a user can always recognize the humidity level in the room.

In this state, when the operation of humidifier 500 is required, the user turns on power switch 10 and sets the desirable humidity and operating time by handling key-input section 20. In addition, the user sets the frequency of the ultrasonic vibrator in order to adjust the amount of atomized water to be sprayed into the room.

2

Then, microcomputer 100 compares the humidity level detected by humidity sensing section 30 with the desirable humidity that is set by the user. When the detected humidity is lower than the desirable humidity, microcomputer 100 sends an operating signal to water atomizing section 60 so as to atomize water contained in the water vessel. At the same time, microcomputer 100 operates blowing section 70 so that atomized water is supplied into the room.

At this time, if water contained in the water vessel is insufficient, water level sensing section 50 sends a signal indicating an insufficiency of water to microcomputer 100. Upon receiving the signal from water level sensing section 50, microcomputer 100 sends an operating signal to alarming section 80 so that alarming section 80 sounds an alarm so as to indicate the insufficiency of water.

When the humidity in the room reaches the desirable humidity, microcomputer 100 sends stop signals to both water atomizing section 60 and blowing section 70 so that humidifier 500 may stop supplying atomized water into the room. In the meantime, when the humidity in the room is lowered again, microcomputer 100 operates both water atomizing section 60 and blowing section 70 again, so that humidifier 500 may supply atomized water into the room again. This process repeats until the operating time set by the user has been completed.

However, the conventional humidifier has a disadvantage that it is necessary to re-adjust the frequency of the ultrasonic vibrator when it is used in different rooms. That is, when the user wants to use the humidifier in a second room after using it in a first room, the user should manually re-adjust the frequency of the ultrasonic vibrator in order to control the amount of atomized water sprayed into the second room.

Furthermore, it is difficult for the conventional humidifier to properly adjust the frequency of the ultrasonic vibrator in accordance with the volume of the room.

SUMMARY OF THE INVENTION

The present invention has been made to overcome the above described problems of the prior art, and accordingly, it is an object of the present invention to provide a method of controlling a humidifier in such a manner that the humidifier can supply a proper amount of atomized water into a room in accordance with the volume of the room, thereby providing an optimum humidity in the room.

To achieve the above object, the present invention provides a method of controlling a humidifier. The humidifier has a microcomputer, a power switch, a key input section for setting various factors such as a desirable humidity and an operating time, a humidity sensing section for detecting a humidity in a room, a water atomizing section, a blowing section for blowing atomized water into the room, and a displaying section for displaying the volume of the room. The water atomizing section includes a heater and an ultrasonic vibrator. The microcomputer includes a memory section in which a plurality of look-up tables are stored. The method comprises the steps of:

(1) recording the humidity of the room;

(2) setting the desirable humidity and the operating time by handling the key input section;

(3) recording a first present time;

(4) recording a second present time when the humidity in the room has reached a predetermined humidity;

(5) recording an elapsed time from the first present time to the second present time;

(6) comparing the elapsed time with the look-up tables;

(7) determining a volume of the room; and (8) operating the vibrator with a predetermined frequency according to the volume of the room.

According to a preferred embodiment of the present invention, in step (1), the humidity of the room is detected by the humidity sensing section even when the power switch is turned off. The method further comprises, between steps (4) and (5), steps of i) operating both the water atomizing section and blowing section, ii) determining whether or not the humidity in the room has reached a predetermined humidity, and iii) repeating i) and ii) if the humidity in the room is lower than the predetermined humidity.

According to another embodiment of the present invention, the method further comprises the steps of:

(9) determining whether or not the humidity in the room has reached the desirable humidity;

(10) stopping both the water atomizing section and the blowing section if the humidity in the room has reached the desirable humidity;

(11) checking whether or not the humidity in the room drops below the desirable humidity;

(12) determining whether or not the operating time has been completed; and (13) finishing an operation of the humidifier if the operating time has been completed.

According to a preferred embodiment of the present invention, the method further comprises, between steps (9) and (10), a step of repeating steps (8) and (9) if the humidity in the room is lower than the desirable humidity. A step of repeating steps (8) to (11) if the humidity in the room drops below the desirable humidity is added between steps (11) and (12).

The method further comprises, between steps (12) and (13), a step of repeating steps (11) and (12) if the operating time has not been completed.

In step 7, the volume level of the room is displayed on a digital meter of the display section. In addition, in step 7, the volume of the room is determined to be a first volume, a second volume, or a third volume. The first volume is smaller than the second volume, and the second volume is smaller than the third volume. Accordingly, the vibrator operates with a low frequency when the volume of the room is the first volume. The vibrator operates with a mid-range frequency when the volume of the room is the second volume. The vibrator operates with a high frequency when the volume of the room is the third volume.

According to the method of the present invention, the humidifier can supply a proper amount of atomized water into the room in accordance with the volume of the room, thereby providing an optimum humidity in the room.

Furthermore, according to the method of the present invention, it is not required to manually adjust the frequency of the ultrasonic vibrator even when the humidifier is used in another room.

BRIEF DESCRIPTION OF THE DRAWINGS

The above object, and other features and advantages of the present invention will become more apparent by describing in detail a preferred embodiment thereof with reference to the attached drawings, in which.

DESCRIPTION OF THE PREFERRED EMBODIMENTS

Hereinafter, the present invention will be described in detail with reference to the accompanying drawings.

Figure 1:
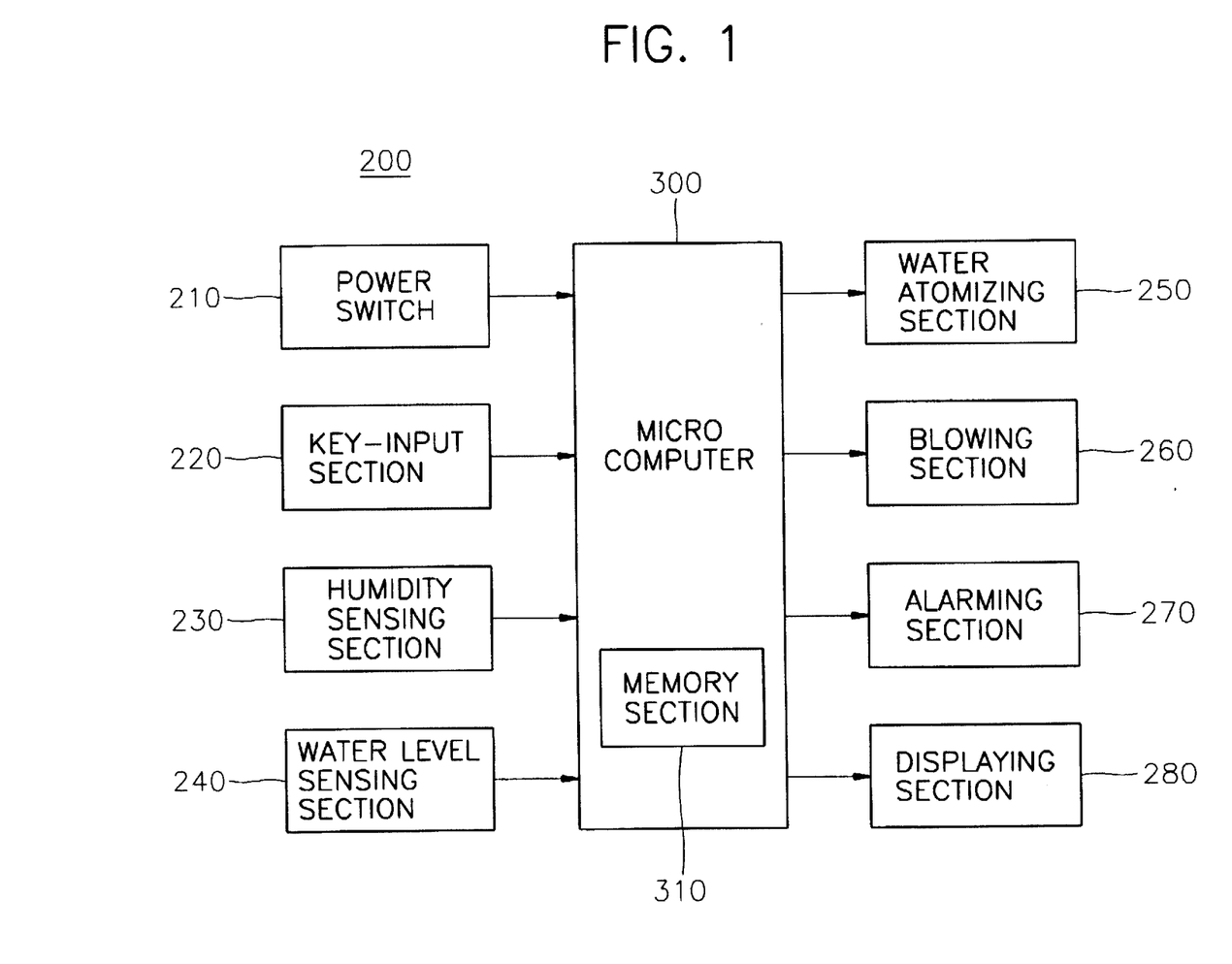
FIG. 1 is a block diagram representing a schematic construction of a humidifier which is controlled by a method according to one embodiment of the present invention.

FIG. 1 shows a block diagram representing a schematic construction of a humidifier 200 which is controlled by a method according to one embodiment of the present invention. As shown in FIG. 1, humidifier 200 comprises a microcomputer 300 for controlling the operation of humidifier 200, a power switch 210 connected to microcomputer 300 for sending an operating signal to microcomputer 300, and a key-input section 220 for setting various factors such as a desirable humidity, and an operating time, etc.

Humidifier 200 further comprises a humidity sensing section 230 which senses a humidity in a room and then sends data thereof to microcomputer 300, and a water level sensing section 240 which senses a level of water contained in a water vessel installed in humidifier 200 and then sends a signal to microcomputer 300 when water contained in the water vessel is insufficient.

Humidifier 200 further comprises a water atomizing section 250 for atomizing water contained in the water vessel, a blowing section 260 for blowing atomized water into the room, an alarming section 270 for indicating an insufficiency of water in the water vessel, and a displaying section 280 for displaying a volume of the room.

Key-input section 210 includes a plurality of button switches which are connected to microcomputer 300 and are provided on an outer surface of humidifier 200. Humidity sensing section 230 includes a humidity sensor which is attached to the outer surface of humidifier 200 and which is connected to microcomputer 100. Water level sensing section 240 includes a float switch installed in the water vessel.

In addition, water atomizing section 250 includes a heater disposed adjacent to the water vessel and an ultrasonic vibrator which atomizes water. Water contained in the water vessel is sterilized and activated by the heater, so that water can be easily atomized by the ultrasonic vibrator. Blowing section 260 includes a blower assembly, alarming section 270 includes an alarm lamp, and displaying section 280 includes a digital meter.

Microcomputer 300 has a memory section 310 in which a plurality of "look-up tables" are stored. The "look-up tables" are data by which volumes of rooms can be determined. Each of the "look-up tables" displays various volumes of rooms as a function of the elapsed time for attaining a predetermined humidity from a present humidity in rooms under various frequencies of the vibrator.

Accordingly, by recognizing the elapsed time for attaining the predetermined humidity from the present humidity in the room under a predetermined frequency of the vibrator, microcomputer 300 can deduce the volume of room.

Microcomputer 300 sends a level of the deduced volume to displaying section 280 so that the volume level of the room is displayed by the digital meter provided on humidifier 200. The "look-up tables" are attained by carrying out hundreds of experiments in various conditions.

Tables 1 and 2 show examples of the "look-up tables", however, they are not intended to limit the present invention.

but intended to illustrate only. In addition, though the predetermined humidity is set to 50% in below tables 1 and 2, the predetermined humidity can be variously set according to embodiments of the present invention.

TABLE 1

| frequency of vibrator (Hz) | 300 | | | | 400 | | | | 500 | | |
|---|---|---|---|---|---|---|---|---|---|---|---|
| time for attaining humidity of 50% (min) | 9 | 11 | 13 | 15 | 7 | 9 | 11 | 13 | 5 | 7 | 9 | 11 |
| volume of the room (m³) | 3 | 4 | 5 | 6 | 3 | 4 | 5 | 6 | 3 | 4 | 5 | 6 |

* detected humidity in a room is 40%

TABLE 2

| frequency of vibrator (Hz) | 300 | | | | 400 | | | | 500 | | |
|---|---|---|---|---|---|---|---|---|---|---|---|
| time for attaining humidity of 50% (min) | 15 | 17 | 19 | 21 | 13 | 15 | 17 | 19 | 11 | 13 | 15 | 17 |
| volume of the room (m³) | 3 | 4 | 5 | 6 | 3 | 4 | 5 | 6 | 3 | 4 | 5 | 6 |

* detected humidity in a room is 20%

As is understood from the above tables 1 and 2, in a state the detected humidity in the room is 20% and the frequency of the vibrator is 300 Hz, when it takes 15 minutes to attain the humidity of 50% in the room, the volume of the room is determined to be 3 m³. In the same condition, when it respectively takes 17, 19 and 21 minutes to attain the humidity of 50% in rooms, volumes of rooms are respectively determined to be 4, 5 and 6 m³.

On the other hand, in a state that the detected humidity in the room is 40% and the frequency of the vibrator is 300 Hz, when it takes 9 minutes to attain the humidity of 50% in the room, the volume of the room is determined to be 3 m³. In the same condition, when it respectively takes 11, 13 and 15 minutes to attain the humidity of 50% in rooms, volumes of rooms are respectively determined to be 4, 5 and 6 m³.

Figure 3:
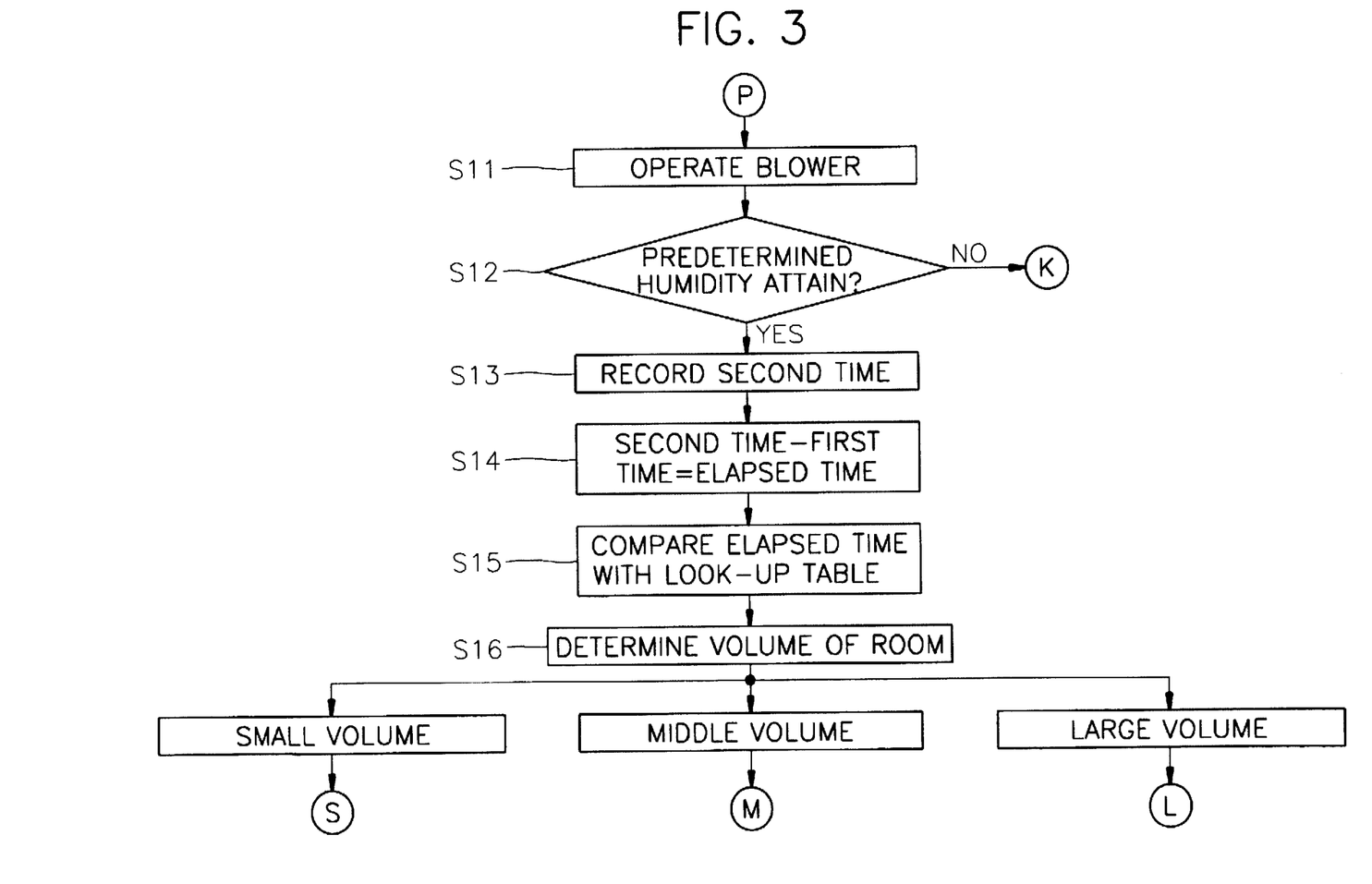
Figure 4:
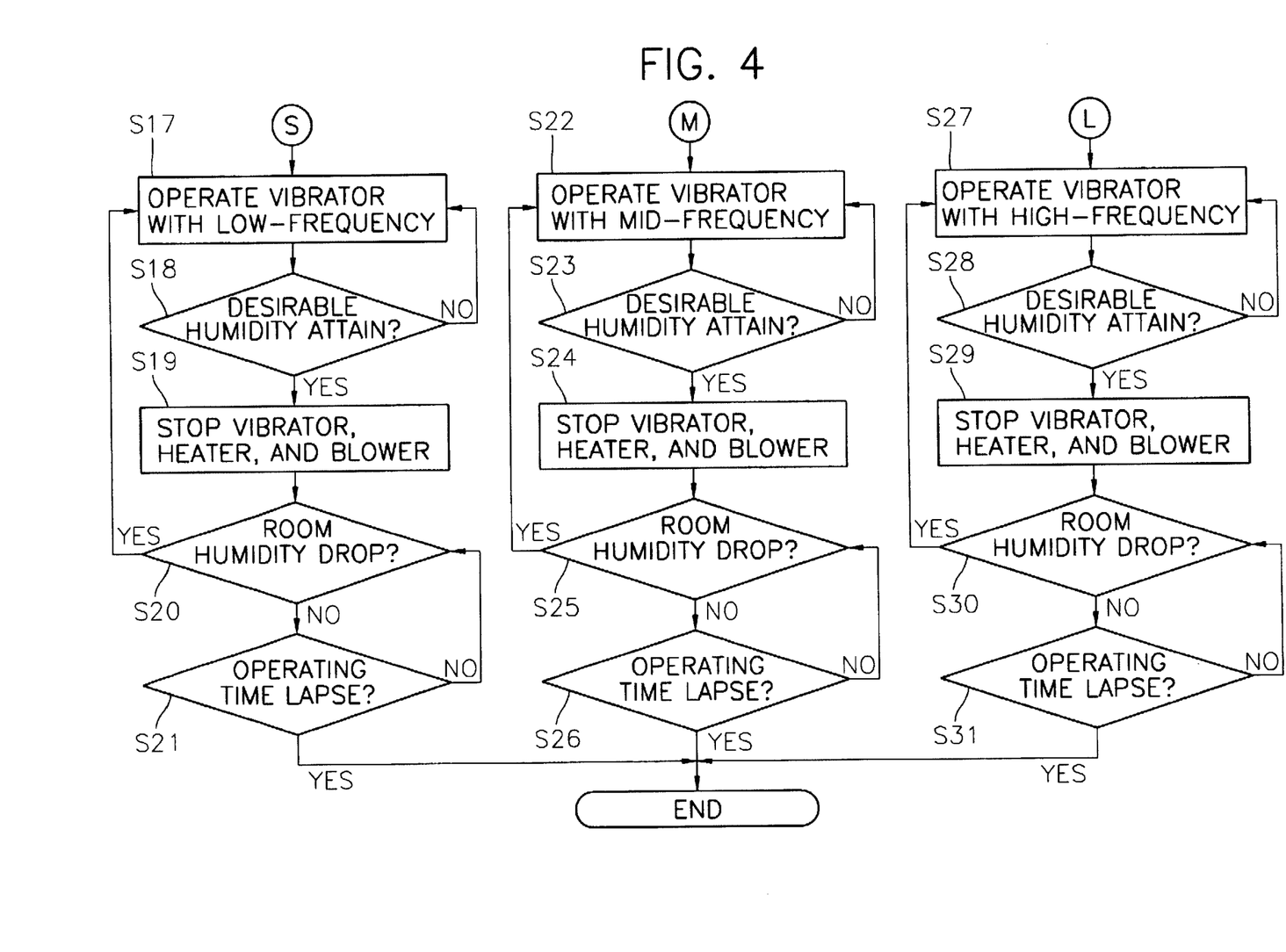

Hereinafter, a method of controlling humidifier 200 having the above construction according to one embodiment of the present invention will be described with reference to FIGS. 2 to 4.

Figure 2:
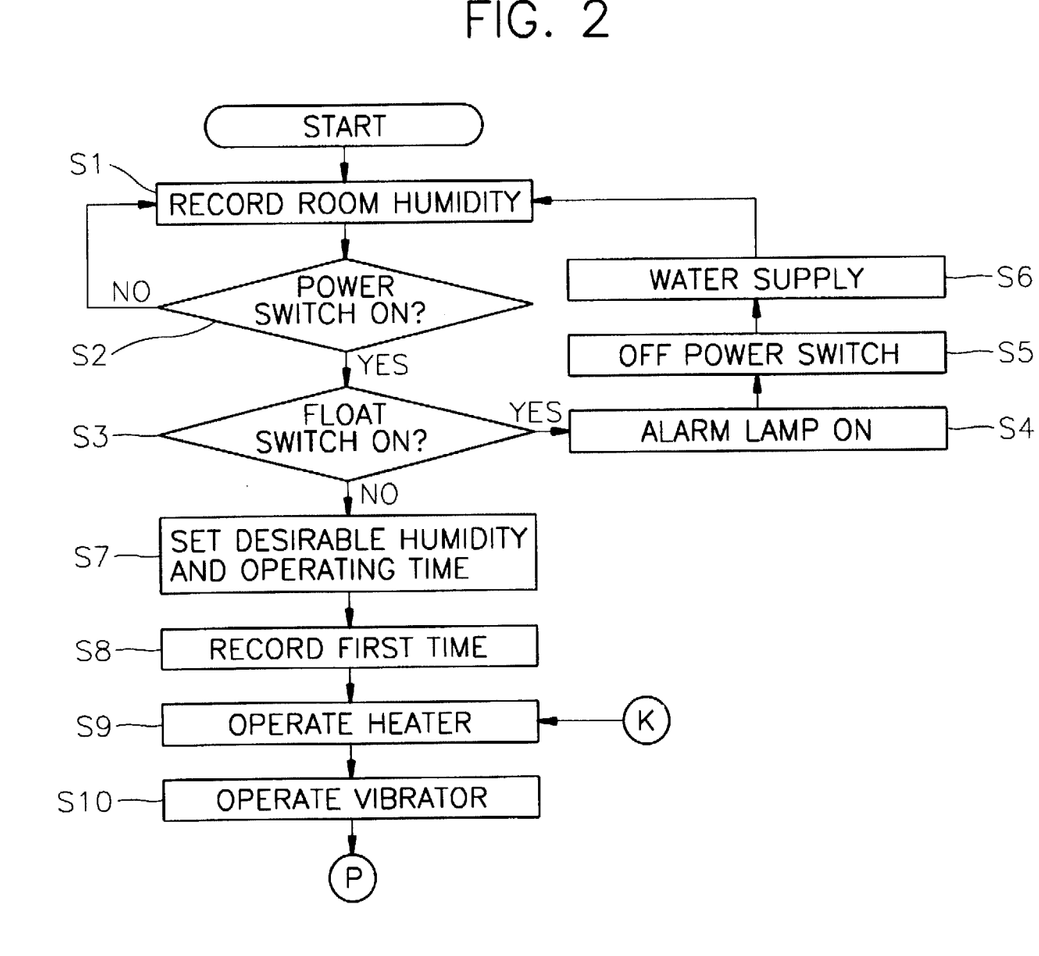
FIGS. 2 to 4 are flow charts showing a method of controlling a humidifier according to one embodiment of the present invention.

As shown in FIG. 2, even when power switch 210 is turned off, humidity sensing section 230 detects the humidity in the room. The humidity level detected by humidity sensing section 230 is displayed by a lamp disposed on the outer surface of humidifier 200, so a user can always recognize the humidity level in the room (step S1).

In this state, when the operation of humidifier 200 is required, the user turns on power switch 210 (step S2). At this time, if water contained in the water vessel is insufficient, the float switch of water level sensing section 240 sends a signal indicating an insufficiency of water to microcomputer 300 (step S3). Upon receiving the signal from the float switch, microcomputer 300 sends an operating signal to alarming section 270 so that the alarm lamp of alarming section 270 may turn on so as to indicate the insufficiency of water (step S4).

When the alarm lamp turns on, the user should turn off power switch 210 and should supply water into the water vessel (steps S5 and S6). After that, the user sets the desirable humidity and operating time by handling key-input section 220 (step S7). At this time, microcomputer 300 records the first present time in memory section 310 (step S8).

Then, microcomputer 300 compares the humidity level detected by humidity sensing section 230 with the desirable humidity which is set by the user. When the detected humidity is lower than the desirable humidity, microcomputer 300 sends an operating signal to both water atomizing section 250 and blowing section 260 so that the heater, ultrasonic vibrator, and blower may operate (steps S9 to S11). As a result, atomized water is supplied into the room.

Next, microcomputer 300 determines whether or not the humidity in the room has reached a predetermined humidity (step S12). If the humidity in the room is lower than the predetermined humidity, steps S9 to S12 may repeat. When the humidity in the room has reached the predetermined humidity, microcomputer 300 records a second present time in memory section 310 (step S13).

Then, microcomputer 300 calculates an elapsed time from the first time to second time (step S14) and compares the elapsed time with the look-up tables (step S15). As a result, microcomputer 300 can determine the volume of the room in which humidifier 200 is used (step S16). At this time, the volume level of the room is displayed on the digital meter of displaying section 280.

When the volume of the room is determined to be a small volume, microcomputer 300 operates the vibrator with a low frequency (step S17). Next, microcomputer 300 determines whether or not the humidity in the room has reached the desirable humidity (step S18). If the humidity in the room is lower than the desirable humidity, steps S17 and S18 may repeat. On the other hand, when the humidity in the room has reached the desirable humidity, microcomputer 300 sends stop signals to both the water atomizing section 250 and blowing section 260, so that the vibrator, heater and blower may stop their operations (step S19).

After step S19, microcomputer 300 checks whether or not the humidity in the room drops below the desirable humidity (step S20). If the humidity in the room drops below the desirable humidity in step S20, steps S17 to S20 may repeat.

Then, microcomputer 300 determines whether or not the operating time has been completed (step S21). At this time, if the operating time has not completed yet in step S21, steps S20 and S21 may repeat. On the other hand, if the operating time has been completed in step S21, microcomputer 300 finishes the operation of humidifier 200.

In the meantime, if the volume of room is determined to be a middle volume in step S16, microcomputer 300 operates the vibrator with a mid-range frequency (step S22). Next, as in the same manner as a case of a small volume, microcomputer 300 determines whether or not the humidity in the room has reached the desirable humidity (step S23). If the humidity in the room is lower than the desirable humidity, the steps S22 and S23 may repeat. On the other hand, when the humidity in the room has reached the desirable humidity, microcomputer 300 sends stop signals to both the water atomizing section 250 and blowing section 260, so that the vibrator, heater and blower may stop their operations (step S24).

After step S24, microcomputer 300 checks whether or not the humidity in the room drops below the desirable humidity (step S25). If the humidity in the room drops below the desirable humidity in step S25, steps S22 to S25 may repeat.

Then, microcomputer 300 determines whether or not the operating time has been completed (step S26). At this time, if the operating time has not completed yet in step S26, steps S25 and S26 may repeat. On the other hand, if the operating time has been completed in step S26, microcomputer 300 finishes the operation of humidifier 200.

In the meantime, if the volume of room is determined to be a large volume in step S16, microcomputer 300 operates the vibrator with a high frequency (step S27). Next, as in the same manner as cases of small and middle volumes, microcomputer 300 determines whether or not the humidity in the room has reached the desirable humidity (step S28). If the humidity in the room is lower than the desirable humidity, steps S27 and S28 may repeat. On the other hand, when the humidity in the room has reached the desirable humidity, microcomputer 300 sends stop signals to both the water atomizing section 250 and blowing section 260, so that the vibrator, heater and blower may stop their operation (step S29).

After step S29, microcomputer 300 checks whether or not the humidity in the room drops below the desirable humidity (step S30). If the humidity in the room drops below the desirable humidity in step S30, steps S27 to S30 may repeat.

Then, microcomputer 300 determines whether or not the operating time has been completed (step S31). At this time, if the operating time has not completed yet in step S31, steps S31 and S32 may repeat. On the other hand, if the operating time has been completed in step S31, microcomputer 300 finishes the operation of humidifier 200.

As described above, according to the method of the present invention, the humidifier can supply a proper amount of atomizer water into the room in accordance with the volume of the room, thereby providing an optimum humidity in the room.

Furthermore, according to the method of the present invention, it is not required to manually adjust the frequency of the ultrasonic vibrator even when the humidifier is used in another room.

While the present invention has been particularly shown and described with reference to the preferred embodiment thereof, it will be understood by those skilled in the art that various changes in form and detail may be effected therein without departing from the spirit and scope of the invention as defined by the appended claims.

What is claimed is:

1. A method of controlling a humidifier having a microcomputer, a power switch, a key input section for setting various factors such as a desirable humidity and an operating time, a humidity sensing section for detecting a humidity in a room, a water atomizing section, a blowing section for blowing an atomized water into the room, and a displaying section for displaying a volume of the room, the water atomizing section including a heater and an ultrasonic vibrator, the microcomputer including a memory section in which a plurality of look-up tables are stored, the method comprising the steps of:

(1) recording the humidity of the room;
(2) setting the desirable humidity and the operating time by handling the key input section;
(3) recording a first present time;
(4) recording a second present time when the humidity in the room has reached a predetermined humidity;
(5) recording an elapsed time from the first present time to the second present time;
(6) comparing the elapsed time with the look-up tables;
(7) determining a volume of the room; and
(8) operating the vibrator with a predetermined frequency according to the volume of the room.

2. The method of controlling the humidifier as claimed in claim 1, wherein in step (1), the humidity of the room is detected by the humidity sensing section even when the power switch is turned off.

3. The method of controlling the humidifier as claimed in claim 1, further comprising a step of turning on the power switch between steps (1) and (2).

4. The method of controlling the humidifier as claimed in claim 1, between steps (4) and (5), further comprising steps of i) operating both the water atomizing section and blowing section, and ii) determining whether or not the humidity in the room has reached a predetermined humidity.

5. The method of controlling the humidifier as claimed in claim 4, after step ii), further comprising a step of repeating steps i) and ii) if the humidity in the room is lower than the predetermined humidity.

6. The method of controlling the humidifier as claimed in claim 1, further comprising the steps of:

(9) determining whether or not the humidity in the room has reached the desirable humidity;
(10) stopping both the water atomizing section and blowing section if the humidity in the room has reached the desirable humidity;
(11) checking whether or not the humidity in the room drops below the desirable humidity;
(12) determining whether or not the operating time has been completed; and
(13) finishing an operation of the humidifier if the operating time has been completed.

7. The method of controlling the humidifier as claimed in claim 6, between steps (9) and (10), further comprising a step of repeating steps (8) and (9) if the humidity in the room is lower than the desirable humidity.

8. The method of controlling the humidifier as claimed in claim 7, between steps (11) and (12), further comprising a step of repeating steps (8) to (11) if the humidity in the room drops below the desirable humidity.

9. The method of controlling the humidifier as claimed in claim 8, between steps (12) and (13), further comprising a step of repeating steps (11) and (12) if the operating time has not been completed.

10. The method of controlling the humidifier as claimed in claim 1, wherein in step 7, a volume level of the room is displayed on a digital meter of the display section.

11. The method of controlling the humidifier as claimed in claim 1, wherein in step 7, the volume of the room is determined to be a first volume, a second volume, or a third volume, the first volume is smaller than the second volume, and the second volume is smaller than the third volume.

12. The method of controlling the humidifier as claimed in claim 11, wherein the vibrator operates with a low frequency when the volume of the room is the first volume.

13. The method of controlling the humidifier as claimed in claim 11, wherein the vibrator operates with a mid-range frequency when the volume of the room is the second volume.

14. The method of controlling the humidifier as claimed in claim 11, wherein the vibrator operates with a high frequency when the volume of the room is the third volume.

15. A method of controlling a humidifier having a microcomputer, a power switch, a key input section for setting various factors such as a desirable humidity and an operating time, a humidity sensing section for detecting a humidity in a room, a water atomizing section, a blowing section for blowing an atomized water into the room, and a displaying section for displaying a volume of the room, the water atomizing section including a heater and an ultrasonic vibrator, the microcomputer including a memory section in which a plurality of look-up tables are stored, the method comprising the steps of:

(1) recording the humidity of the room;

(2) setting the desirable humidity and the operating time by handling the key input section;

(3) recording a first present time;

(4) recording a second present time when the humidity in the room has reached a predetermined humidity;

(5) recording an elapsed time from the first present time to the second present time;

(6) comparing the elapsed time with the look-up tables;

(7) determining a volume of the room;

(8) operating the vibrator with a predetermined frequency according to the volume of the room;

(9) determining whether or not the humidity in the room has reached the desirable humidity;

(10) repeating steps (8) and (9) if the humidity in the room is lower than the desirable humidity;

(11) stopping both the water atomizing section and blowing section if the humidity in the room has reached the desirable humidity;

(12) checking whether or not the humidity in the room drops below the desirable humidity;

(13) repeating steps (8) to (12) if the humidity in the room drops below the desirable humidity;

(14) determining whether or not the operating time has been completed;

(15) repeating steps (12) and (14) if the operating time has not been completed; and (16) finishing an operation of the humidifier if the operating time has been completed.

16. The method of controlling the humidifier as claimed in claim 15, wherein in step (1), the humidity of the room is detected by the humidity sensing section even when the power switch is turned off.

17. The method of controlling the humidifier as claimed in claim 15, between steps (1) and (2), further comprising a step of turning on the power switch.

18. The method of controlling the humidifier as claimed in claim 15, between steps (4) and (5), further comprising steps of i) operating both the water atomizing section and blowing section, and ii) determining whether or not the humidity in the room has reached a predetermined humidity.

19. The method of controlling the humidifier as claimed in claim 18, after step ii), further comprising a step of repeating steps i) and ii) if the humidity in the room is lower than the predetermined humidity.

20. The method of controlling the humidifier as claimed in claim 15, wherein in step 7, a volume level of the room is displayed on a digital meter of the display section.

21. The method of controlling the humidifier as claimed in claim 15, wherein in step 7, the volume of the room is determined to be a first volume, a second volume, or a third volume, the first volume is smaller than the second volume, and the second volume is smaller than the third volume.

22. The method of controlling the humidifier as claimed in claim 21, wherein the vibrator operates with a low frequency when the volume of the room is the first volume.

23. The method of controlling the humidifier as claimed in claim 21, wherein the vibrator operates with a mid-range frequency when the volume of the room is the second volume.

24. The method of controlling the humidifier as claimed in claim 21, wherein the vibrator operates with a high frequency when the volume of the room is the third volume.

25. A method of controlling a humidifier having a microcomputer, a power switch, a key input section for setting various factors such as a desirable humidity and an operating time, a humidity sensing section for detecting a humidity in a room, a water atomizing section, a blowing section for blowing an atomized water into the room, and a displaying section for displaying a volume of the room, the water atomizing section including a heater and an ultrasonic vibrator, the microcomputer including a memory section in which a plurality of look-up tables are stored, the method comprising the steps of:

(1) recording the humidity of the room;

(2) turning on power switch;

(3) setting the desirable humidity and the operating time by handling the key input section;

(4) recording a first present time;

(5) operating both the water atomizing section and blowing section;

(6) determining whether or not the humidity in the room has reached a predetermined humidity;

(7) repeating steps (5) and (6) if the humidity in the room is lower than the predetermined humidity in step (6);

(8) recording a second present time if the humidity in the room has reached the predetermined humidity in step (6);

(9) recording an elapsed time from the first time to the second time;

(10) comparing the elapsed time with the look-up tables;

(11) determining a volume of the room;

(12) operating vibrator with a predetermined frequency according to the volume of the room;

(13) determining whether or not the humidity in the room has reached the desirable humidity;

(14) repeating steps (12) and (13) if the humidity in the room is lower than the desirable humidity in step (13);

(15) stopping both the water atomizing section and blowing section if the humidity in the room has reached the desirable humidity in step (13);

(16) checking whether or not the humidity in the room drops below the desirable humidity;

(17) repeating steps (12) to (16) if the humidity in the room drops below the desirable humidity in step (16);

(18() determining whether or not the operating time has been completed;

(19) repeating steps (16) to (18) if the operating time has not completed in step (18); and (20) finishing an operation of the humidifier if the operating time has been completed in step (18).

26. The method of controlling the humidifier as claimed in claim 25, wherein in step 11, a volume level of the room is displayed on a digital meter of the display section.

27. The method of controlling the humidifier as claimed in claim 25, wherein in step 7, the volume of the room is determined to be a first volume, a second volume, or a third volume, the first volume is smaller than the second volume, and the second volume is smaller than the third volume.

28. The method of controlling the humidifier as claimed in claim 27, wherein the vibrator operates with a low frequency when the volume of the room is the first volume.

29. The method of controlling the humidifier as claimed in claim 28, wherein the vibrator operates with a mid-range frequency when the volume of the room is the second volume.

30. The method of controlling the humidifier as claimed in claim 29, wherein the vibrator operates with a high frequency when the volume of the room is the third volume.

* * * * *